United States Patent [19]

Nakada et al.

[11] Patent Number: 4,979,963

[45] Date of Patent: Dec. 25, 1990

[54] PROCESS FOR COLORING EXPANDABLE POLYSTYRENE BEADS

[75] Inventors: Junichi Nakada; Toshiaki Yamamoto; Minoru Tada; Kyoichi Nakamura, all of Kamisu, Japan

[73] Assignee: Kanegafuchi Kagaku Kogyo Kabushiki Kaisha, Osaka, Japan

[21] Appl. No.: 327,625

[22] Filed: Mar. 24, 1989

[30] Foreign Application Priority Data

Mar. 25, 1988 [JP] Japan .................................. 63-71327

[51] Int. Cl.$^5$ ............................ C08J 3/20; C08J 9/22; C08L 25/04
[52] U.S. Cl. ........................................ 8/514; 8/475; 8/513
[58] Field of Search ............................................. 8/514

[56] References Cited

U.S. PATENT DOCUMENTS 4,950,303  8/1990  Ishii ........................................ 8/513

FOREIGN PATENT DOCUMENTS

| | | |
|---|---|---|
| 52-22062 | 2/1977 | Japan . |
| 58-109538 | 6/1983 | Japan . |
| 58/204034 | 11/1983 | Japan . |
| 59/033302 | 2/1984 | Japan . |
| 59/056433 | 3/1984 | Japan . |
| 60/250047 | 12/1985 | Japan . |
| 62/161843 | 7/1987 | Japan . |

*Primary Examiner*—A. Lionel Clingman
*Attorney, Agent, or Firm*—Sughrue, Mion, Zinn, Macpeak & Seas

[57] ABSTRACT

This invention provides a process for coloring expandable beads of polystyrene resins which comprises suspending expandable beads of a polystyrene resin and a dye in water in a closed vessel and heating this aqueous suspension at a temperature above the softening point of the expandable beads, wherein the closed vessel is filled up almost completely with the aqueous suspension and heating is conducted without further addition of any blowing agent, whereby the expandable beads are impregnated uniformly with the dye. According to this process, uniformly colored expandable beads of polystyrene resins are obtained at a high efficiency of dye impregnation without using any impregnation aid or the like, the expandable beads being capable of forming beautiful molded foams of uniform color.

5 Claims, No Drawings

PROCESS FOR COLORING EXPANDABLE POLYSTYRENE BEADS

BACKGROUND OF THE INVENTION

1. Field of the Invention

This invention relates to a process for coloring expandable polystyrene beads. More particularly, it relates to a process for coloring, at a high efficiency of dye penetration, expandable polystyrene beads without any addition of a blowing agent which increases the pressure of the gaseous phase for the prevention of foaming of said beads in the process of coloring or a solvent which serves as a dye penetration aid, said colored beads forming molded foams of satisfactory coloration and an excellent appearance.

2. Description of the Prior Art

Polystyrene beads impregnated with a blowing agent have been extensively used for the manufacture of molded foams, and colored expandable beads have been used for the manufacture of colored foams.

The following methods are known for coloring expandable beads: (A) adding a dye or a pigment to expandable beads in a vessel and agitating the mixture; (B) suspending expandable beads in water and adding to this aqueous suspension a dye and a blowing agent or a solvent; and (C) adding a dye to an aqueous suspension of resinous beads in the polymerizing step of the resin, thus coloring the beads simulaneously with impregnation with a blowing agent.

The method (A) is usually adopted in expansion molding factories. However, a dye or pigment applied by this method does not stick fast to the surfaces of expandable beads, hence, it tends to be washed off by steam used in a preexpansion or a molding step. Particularly in a molding step, steam is violently ejected through slits of a mold, making the tint around the slits lighter than at areas other than at the slits. It is therefore difficult to obtain molded foams uniformly colored. In addition, the distribution of the dye or pigment on the surfaces of the expandable beads is not even, resulting in a nonuniform coloring. There is also some difference in coloration between the surface and the inside of the bead, as can be seen when an expanded bead is split. Furthermore, this method is normally carried out by agitating the mixture in an open vessel for 20 to 30 minutes, thus permitting the blowing agent contained in the beads to be released and hence resulting in lowered expandability.

Also in the methods (B) and (C), a difference in coloration between the surface and the inside of an expanded bead is unavoidable, because most colorants commonly used are very slow to penetrate into the bead and hence tend to remain near its surface.

Foams molded from expandable beads colored by any of the methods (A), (B) or (C) also have the problem that colorant migration often takes place to contaminate other objects because of low adhesion of the colorant.

In the method (B), a technique is also adopted in which the aqueous suspension is heated to a temperature higher than the softening point of the expandable beads to accelerate dye penetration. In this case, heating to such a temperature without foaming of the expandable beads requires addition of a blowing agent to increase the pressure of the gaseous phase in the system. The amount of the blowing agent added to the system needs to be enough for saturating the gaseous phase at a coloring temperature. Meanwhile, most of the blowing agent added at an ambient temperature in the form of liquid is consumed to penetrate into the expandable beads, and hence it is necessary to add the agent in an amount greater than needed theoretically to prevent foaming of the beads, resulting in an increase in the content of the blowing agent in the beads, even when it is not intended. When general-purpose expandable beads of a specified high content of a blowing agent, for example, are colored by the method of (B) immediately after production of the beads, the colored beads will contain a larger amount of the blowing agent, adversely affecting expandability and moldability of the beads and the cell structures of molded foams. It is therefore necessary to use expandable beads produced especially for coloring whose blowing agent content is lower than specifications, or to pretreat general-purpose beads before coloring to lower the content of the blowing agent by a suitable method. This is unfavorable to an industrial application.

To solve the problems described above, we tried to color expandable beads at a temperature higher than the softening point thereof while preventing foaming of the beads by introduction of an inert gas such as nitrogen to increase the pressure in the gaseous phase. But no satisfactory result was obtained.

Our studies also revealed that heating expandable beads to allow a blowing agent to move rapidly in the beads adversely affects moldability of the beads and their cell structure, physical properties and the appearance of molded foams, and that similar troubles also occur when expandable beads are further impregnated with a blowing agent in the form of a liquid.

SUMMARY OF THE INVENTION

The primary object of this invention is to provide a process for coloring, at a high efficiency of dye penetration, expandable polystyrene beads without any addition of blowing agent which increases the pressure of the gaseous phase for the prevention of foaming of said beads in the process of coloring or a solvent which serves as a dye penetration aid, said colored beads forming beautiful molded foams of satisfactory coloration.

The other objects and advantages of this invention will be easily understood by those skilled in the art from the following explanations.

As a result of our intensive studies to achieve the above-mentioned objects, we have established a new process for coloring expandable polystyrene beads where a dye penetrates into said beads at a temperature higher than the softening point of the beads without any addition of a blowing agent or the like, that is, without causing any change in the content of a blowing agent in the beads. The colored expandable beads thus obtained have moldability equal to or even better than that of the beads before coloring. In addition, even when foamed immediately after coloring, the resulting molded foams are uniformly colored both on their surfaces and in their insides with no release of the applied dye, and compare favorably with uncolored molded foams in cell structures.

DETAILED DESCRIPTION OF THE INVENTION

This invention relates to a process for coloring expandable polystyrene beads which comprises suspending expandable beads and a dye in water in a closed vessel and heating this aqueous suspension to a temperature higher then the softening point of said expandable beads, wherein the closed vessel is filled up almost completely with said aqueous suspension and heating is conducted without any addition of a blowing agent, thereby impregnating uniformly said expandable beads with the dye.

The polystyrene resins herein include homopolymers of styrene and/or copolymers of styrene and an ethylenically unsaturated monomer of which styrene contents are 50 weight % or more.

As examples of the easily volatile blowing agent, there may be mentioned, among others, lower aliphatic hydrocarbons, alicyclic hydrocarbons and lower aliphatic halogenated hydrocarbons. The content of a blowing agent varies with the intended expansion ratio of molded foams and other factors but is normally in the range from 1 to 10 parts by weight based on 100 parts by weight of the polystyrene resin.

The dye used in the process of this invention is a colorant including a pigment soluble in an easily volatile blowing agent contained in expandable beads, and is preferably a liquid or a solid whose melting point is 200° C. or lower in view of a short time required for coloring owing to its rapid penetration into the beads. Illustrative examples include Solvent Yellow 56 (Sot Yellow-1 ®; Hodogaya Chemical Industry Co., Ltd.), Solvent Yollow 16 (Sot Yellow-3 ®; Hodogaya Chemical Industry Co., Ltd.), Solvent Blue 14 (Sot Blue-2 ®; Hodogaya Chemical Industry Co., Ltd.), Solvent Blue 94 (Sot Blue-3 ®; Hodogaya Chemical Industry Co., Ltd.) and Solvent Red 27 (Sot Red-2 ®; Hodogaya Chemical Industry Co., Ltd.). The amount of a dye to be used varies with the intended depth of color, but is normally in the range from 0.01 to 2.0% based on the weight of expandable polystyrene beads. For some types of dye, use of an excess amount should be avoided because a considerable amount of the dye remains in the aqueous medium after coloring. However, the dye remaining in the aqueous medium can be easily disposed of by conventioned waste water treating facilities, causing no water pollution problem.

As examples of the dispersant used for suspending expandable polystyrene beads in water, there may be mentioned inorganic dispersants, such as aluminum oxide, titanium dioxide, calcium carbonate, basic magnesium carbonate and tribasic calcium phosphate; protective colloids of a water-soluble polymer type, such as polyvinyl alcohol, carboxymethylcellulose and polyvinyl pyrrolidone; anionic surface-active agents, such as sodium dodecylbenzenesulfonate, sodium olefinsulfates, N-acylmethyl taurines, dialkyl sodium sulfosuccinates and sodium α-olefinsulfonates; and nonionic surface-active agents.

Impregnation of expandable polystyrene beads with a dye is carried out as described below. The expandable beads and the dye are added to an aqueous medium containing a dispersant, and the resulting suspension is charged into a closed vessel equipped with a stirrer so that substantially no gaseous phase is left (almost completely full of the suspension). In order to ensure rapid dispersion of a dye having a rather low affinity for water, it is preferable to previously disperse the dye in water and to add this slurry to the suspension of the expandable beads. Heating is started after an accumulator preset at a determined pressure is connected to the vessel so that expansion of the contents of the vessel do not cause an unusual rise in the internal pressure. The present pressure of the accumulator depends on the amount of the expandable beads charged, the content of the blowing agent, the coloring temperature and other conditions, and must be such that the final internal pressure will be in the range from 10 to 20 Kg/cm$^2$. As a general rule, the preset value should be higher enough than the vapor pressure of the blowing agent at the surface of the expandable bead to prevent expansion of the beads during coloring.

The coloration of the expandable polystyrene beads thus obtained is uniform not only at the surface but also in the inside of the beads, and no migration of the applied dye occurs. The content of the blowing agent of the beads does not change befor and after coloration, thus requiring no aging before preexpansion of the beads prior to molding. Hence, beautiful molded foams which have uniform cell structures and where the applied dye does not migrate can be obtained even when foamed immediately after coloring.

In the process of this invention, the blowing agent contained in the expandable beads does not run out into the aqueous medium except for a very small amount dissolved in the medium owing to a rather low water solubility of the blowing agent. In addition, the closed vessel contains practically no gaseous phase and the beads are kept under a water pressure higher than the vapor pressure of the blowing agent at the surface of the beads. These allow uniform coloration by heating at a temperature higher than the softening point of the beads with no change in the content of the blowing agent and no expansion of the beads.

In general, rapid penetration or vaporization of a blowing agent tends to adversely affect uniform cell formation during expansion molding. This can be avoided by the process of this invention in which practically no migration of a blowing agent takes place.

As is apparent from the foregoing, the process of this invention has many advantages as enumerated below: (1) the content of the blowing agent for the expandable beads remains unchanged during coloring; (2) there is no need for addition of a blowing agent or solvent; (3) there is no need for aging after coloring because of no change in the content of the blowing agent, thereby giving beautiful molded foams of uniform cell structures even when foamed immediately after coloring; and (4) uniformly colored, beautiful expandable beads can be otained, and coloration of the molded foams is also very satisfactory.

The following Examples and Comparative Examples will further illustrate the present invention, but the present invention is not limited thereby or thereto.

EXAMPLE 1

A blue dye (Sot-Blue-2) was used in this experiment to color expandable polystyrene beads containing butane of about 8 weight % as a blowing agent (Kanepearl ®: Kanegafuchi Chemical Industry Co., Ltd.; the beads whose expansion ratio is about 70 when steam-heated for 3 minutes).

To an autoclave with a capacity of 5 liters were charged about 2,000 g of water, 1,800 g of the expandable beads, and a mixed dispersant consisting of 9 g of tribasic calcium phosphate and 0.18 g of a sodium α-olefinsulfonate, and the mixture was stirred for ten minutes to obtain a slurry. Separately, 150 g of water, 4.5 g of Sot Blue-2 and 0.71 g of a mixed dispersant of the same composition as above were placed in a beaker, and the mixture was stirred to prepare a dye slurry. This was charged into the autoclave, and water was added with stirring until the autoclave became full of the liquid. A bladder-type accumulator whose actual gas capacity was 3.7 liters with the nitrogen pressure preset at 14.5 Kg/cm² was then connected to the autoclave, and the contents were heated over a period of 1.5 hours so as to reach 114° C. Heating at that temperature was continued for 3 hours with stirring, the contents were then allowed to cool over a period of 2 hours so as to reach ambient temperature, and colored expandable beads were taken out from the autoclave.

The beads thus obtained were found to be uniformly colored with no mottle, to contain the blowing agent at about 8 weight % (nearly equal to the content before coloring), to have no bubbles formed inside, and to show no change in expandability (the expansion ratio was about 70 when steam-heated for 3 minutes).

These expandable beads were preexpanded with an expansion ratio of about 60 immediately after coloring by a steam-heated preexpansion machine, allowed to stand for 24 hours for aging, and then subjected to molding, giving molded foams. The surface of the molded foams thus obtained was rubbed with a sheet of filter paper to check migration of the dye, but no migration to the filter paper was observed at all. The foams were cut by a slicer to observe the coloration and cell structures of the inside of the foams. It was demonstrated that the inside was also colored uniformly, and that the formed cells were uniform and regularly arranged as in uncolored foams though the preexpansion and molding were conducted immediately after coloring.

EXAMPLES 2 THROUGH 4

Colored expandable beads were prepared in the same way as in Example 1 by using different kinds of dyes, and the colored beads and foams molded therefrom were evaluated in terms of coloration and cell structures. The results are summarized in Table 1.

COMPARATIVE EXAMPLE 1

A coloring test was carried out using the same expandable beads and the same dye as in Example 1.

To an autoclave with a capacity of about 5 liters were charged about 2,400 g of water, 1,800 g of the expandable beads, and a mixed dispersant consisting of 9 g of tribasic calcium phosphate and 0.18 g of a sodium α-olefinsulfonate, and the mixture was stirred for ten minutes to obtain a slurry. Separately, 150 g of water, 4.5 g of Sot Blue-2 and 0.71 g of a mixed dispersant of the same composition as above were placed in a beaker, and the mixture was stirred to prepare a dye slurry. This was charged into the autoclave, the contents were stirred for 5 minutes, and 54 g of butane was added at ambient temperature, when the autoclave was not full of the liquid.

The contents were heated over a period of 3 hours so as to reach 114° C., heating at that temperature was continued for 1 hour, the contents were then allowed to cool over a period of 2 hours so as to reach ambient temperature, and colored expandable beads were taken out from the autoclave.

The beads thus obtained were found to contain the blowing agent at 9.8 weight % in contrast to about 8 weight % before coloring, and marked mottles were observed on the face of the foams molded by steam heating. In addition, observation of a cutting plane of the foams revealed an irregular cell structure and nonuniform coloration.

COMPARATIVE EXAMPLE 2

An experiment was conducted in the same manner as in Comparative Example 1 except that nitrogen gas in place of butane was introduced at ambient temperature to reach a pressure of 4 Kg/cm². The experiment was discontinued because the stirrer of the autoclave stopped when the temperature of the contents exceeded 80° C. When the autoclave was opened after cooling, it was found that the beads charged completely expanded into a solid mass, thereby the stirrer being stopped.

As can be seen from the results shown in Table 1, both of the surfaces and the insides of the colored expandable polystyrene beads of this invention are uniformly colored, causing neither dye migration nor bubble formation in the insides of the beads, and the beads can be expanded and molded into beautiful foams, where dye does not migrate.

TABLE 1

| | Blowing agent content (wt %) | | | | | Dye migration | |
|---|---|---|---|---|---|---|---|
| | Beads before coloring | Beads after coloring | Dye type | Coloration in beads | Bubbles in beads | from beads or foams | Coloration in foams |
| Example 1 | 7.99 | 8.06 | Sot Blue-2 | Uniform | None | No | Uniform |
| Example 2 | 7.84 | 7.81 | Sot Green-2*¹ | Uniform | None | No | Uniform |
| Example 3 | 8.03 | 8.10 | Sot Brown-2*² | Uniform | None | No | Uniform |
| Example 4 | 7.85 | 7.82 | Sot Yellow-1 | Uniform | None | No | Uniform |
| Comp. Ex. 1 | 7.96 | 9.82 | Sot Blue-2 | Uniform | None | No | Nonuniform |
| Comp. Ex. 2 | 8.10 | — | Sot Blue-2 | — | Some | — | — |

*¹Solvent Green 3  *²Solvent Brown 5

What is claimed is:

1. A process for coloring expandable beads of polystyrene resin which comprises suspending expandable beads of a polystyrene resin which contain a blowing agent and a solvent dye in water in a closed vessel and heating this aqueous suspension at a temperature above the softening point of said expandable beads, wherein said closed vessel is filled up almost completely with said aqueous suspension and heating is conducted without further addition of any blowing agent, whereby said expandable beads are impregnated uniformly with the solvent dye.

2. The process as defined in claim 1, wherein the solvent dye is previously suspended in water and the expandable beads are then dispersed in this suspension.

3. The process as defined in claim 1 or 2, wherein the internal pressure of said closed vessel is controlled at a level higher than the vapor pressure of the blowing agent contained in the expandable.

4. The process as defined in claim 3, wherein the internal pressure of said closed vessel is controlled within the range between 10 and 20 Kg/cm².

5. The process as defined in any of the claims 1 through 4, wherein the solvent dye is used in an amount of 0.01 to 2.0% based on the weight of the expandable beads.

* * * * *